US005688030A

United States Patent [19]
McAnally et al.

[11] Patent Number: 5,688,030
[45] Date of Patent: Nov. 18, 1997

[54] ELECTRONIC EQUIPMENT ENCLOSURE WITH SUPPORT MEMBERS

[76] Inventors: Andrew McAnally, 4318 E. Cordoba Cir.; Stephen Cook, 310 Fawn Ridge St., both of Georgetown, Tex. 78628

[21] Appl. No.: 689,512

[22] Filed: Aug. 9, 1996

[51] Int. Cl.⁶ .................................................. F16M 11/20
[52] U.S. Cl. ........................ 312/223.2; 312/351.1; 248/500; 403/348
[58] Field of Search ............................ 248/518, 222.41, 248/500, 188.1, 188.8; 312/223.2, 351.1; 361/683; 220/630, 636, 632; 403/348, 350, 354

[56] References Cited

U.S. PATENT DOCUMENTS

| | | |
|---|---|---|
| D. 358,141 | 5/1995 | Pecone et al. . |
| 2,068,920 | 1/1937 | Langille .................. 220/632 |
| 3,401,908 | 9/1968 | Rapata .................. 248/188.8 |
| 3,921,780 | 11/1975 | Gentzlinger et al. ........... 248/500 X |
| 4,635,811 | 1/1987 | Lodi .................. 108/51.1 X |
| 5,155,662 | 10/1992 | I-Shou . |
| 5,233,594 | 8/1993 | Wilhelm . |
| 5,317,483 | 5/1994 | Swindler . |
| 5,347,425 | 9/1994 | Herron et al. ............... 361/683 X |
| 5,347,430 | 9/1994 | Curlee et al. . |
| 5,349,483 | 9/1994 | Tsai . |
| 5,355,267 | 10/1994 | Aoyagi et al. . |
| 5,388,792 | 2/1995 | Hastings et al. ............ 248/188.1 |
| 5,488,538 | 1/1996 | Wakita . |

FOREIGN PATENT DOCUMENTS

| | | |
|---|---|---|
| 0 337 399 A2 | 10/1989 | European Pat. Off. . |
| 0 632 455 A1 | 1/1995 | European Pat. Off. . |
| 0 680 047 A2 | 11/1995 | European Pat. Off. . |

*Primary Examiner*—Peter M. Cuomo
*Assistant Examiner*—Janet M. Wilkens

[57] ABSTRACT

An enclosure for electronic equipment, such as a computer, and one or more support members mechanically attached to the enclosure. The bottom plate of the enclosure defines a pair of spaced slots for receiving each support member. One end of each support member is adapted to engage the surface on which the equipment is to be supported, a pair of spaced posts project from the other end of each support member, and a head is provided on the end of each post. Each support member is mounted to the enclosure by inserting the heads in the ends of the respective slots and rotating the support member to move the heads and the posts of the support member to the other ends of their respective slots which locks the support member to the bottom plate without protruding into the interior of the enclosure.

13 Claims, 1 Drawing Sheet

ELECTRONIC EQUIPMENT ENCLOSURE WITH SUPPORT MEMBERS

TECHNICAL FIELD

The invention relates generally to the field of electronic equipment such as computers, or the like, and, more particularly, to an enclosure for electronic equipment having a one or more members for supporting the enclosure.

BACKGROUND OF THE INVENTION

It is well recognized that enclosures for electronic equipment, such as computers, and the like, should be provided with support members, or feet, to prevent damage to the furniture on which the equipment is placed and to prevent sliding of the equipment.

However, in most cases, the support members are attached to the enclosure by adhesive which raise environmental concerns and which lose their adhesive characteristics with age. In other arrangements, the support members are attached to the enclosure by screws that extend through the members and into appropriate openings in the enclosure. However, these arrangements require multiple parts and it is relatively difficult to attach and remove the support members. Still other arrangements use one-piece elastomer feet which require a relatively large clearance area in the interior of the enclosure to accommodate the feet.

Therefore, what is needed is an enclosure for electronic equipment which has one or more support members mounted to its bottom plate which are relatively easily attached to the enclosure without the use of additional parts and adhesives, and which do not protrude into the interior of the enclosure.

SUMMARY OF THE INVENTION

The present invention, accordingly, provides an enclosure for electronic equipment, such as a computer, and one or more support members which can be mechanically attached to the enclosure in a relatively easy manner, while eliminating the need for adhesives and additional parts, as well as the need for any clearance area in the interior of the enclosure. To this end, the bottom plate of the enclosure defines a pair of spaced slots for receiving each support member. A pair of spaced posts project from one end of each support member, and a head is provided on the end of each post. The design is such that the heads of each support member can be inserted in the ends of their respective slots, and the support member rotated, to move the heads and the posts of the support member to the other ends of their respective slots to lock the support member to the bottom plate.

Advantages are achieved with the enclosure and the support members of the present invention since the support members can be easily attached to the enclosure without the use of additional parts and adhesives, while eliminating the need for any clearance area in the interior of the enclosure for the equipment.

BRIEF DESCRIPTIONS OF THE DRAWINGS

Figure 3:
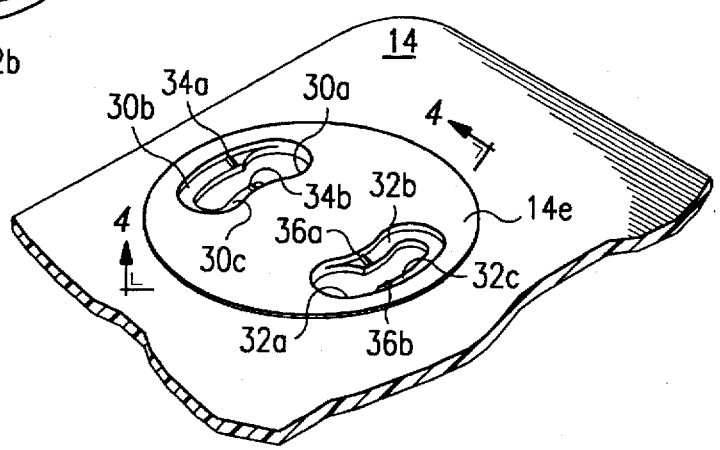
FIG. 3 is a enlarged, partial, perspective view of the interior of the enclosure, depicting the support member of FIG. 2 mounted to the bottom plate of the enclosure.

FIG.. 4 is a cross-sectional view taken along the line 4—4 of FIG. 3.

DETAILED DESCRIPTION OF THE PREFERRED EMBODIMENT

Referring to FIG.. 1 of the drawings, the reference numeral 10 refers to a computer having an enclosure 12 consisting of a bottom plate 14, two side walls 14a and 14b, and a top wall 14c. Five support members, or feet, 18 are mounted to the bottom plate 14 in a manner to be described.

Figure 2:
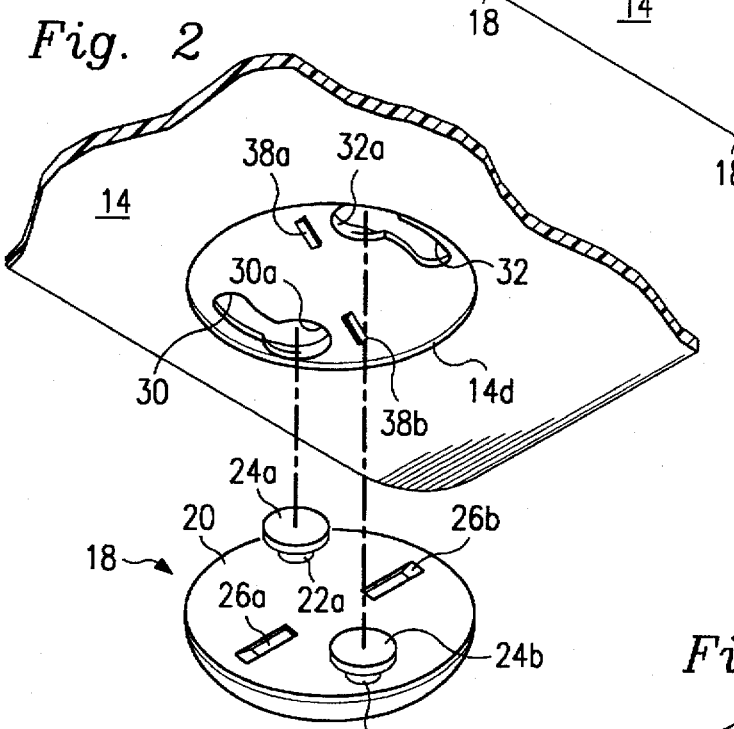
FIG. 2 is an enlarged, partial, exploded, perspective view of the enclosure and a support member of FIG. 1.

One of the support members 18 is shown in detail in FIG. 2, it being understood that the other four members are constructed and arranged in an identical manner. The support member 18 includes a body, or base, 20 having a flat upper surface and two spaced posts 22a and 22b extending upwardly from the latter surface. Two enlarged heads 24a and 24b are disposed on the respective distal ends of the posts 22a and 22b, and a pair of spaced, tapered slots 26a and 26b are formed in the upper surface of the base 20. Preferably, the support member 18 is fabricated from an elastomer material and the posts 22a and 22b as well as the heads 24a and 24b are all molded integrally with the base 20.

The bottom plate 14 of the enclosure 12 is adapted to receive the support members 18 and the portion of the bottom plate that receives the support member 18 of FIG. 2 is also shown in detail in the latter figure. More specifically, a counterbore, or circular recess 14d, is provided in the bottom plate 14, with the diameter of the counterbore being substantially the same as that of the support member 18 to receive the member in a tight fit. A pair of arcuate "keyhole" slots 30 and 32 are formed through the recessed portion 14d of the bottom plate 14 and have enlarged end portions 30a and 32a, which are slightly greater than the diameter of the heads 24a and 24b of the support member 18. The widths of the slots 30 and 32 are less than the diameters of the heads 24a and 24b, respectively, and substantially the same as the diameters of the posts 22a and 22b, respectively. The design is such that the enlarged end portions 30a and 32a receive the heads 24a and 24b, respectively and the slots 30 and 32 receive the posts 22a and 22b, respectively in a tight fit but prevent any movement of the heads 24a and 24b, respectively through the slots, for reasons that will be described in detail.

As shown in FIG. 3, the upper surface of the bottom plate 14 has a raised circular portion 14e within which is disposed the slots 30 and 32. The opposed portions of the surface of the bottom plate 14 that define the slot 30 form two parallel spaced guide surfaces 30b and 30c, the upper surfaces of which extend below the upper surface of the bottom plate 14. Similarly, the opposed portions of the surface of the bottom plate 14 that define the slot 32 form two parallel spaced guide surfaces 32b and 32c the upper surfaces of which also extend below the upper surface of the bottom plate 14. A pair of detents 34a and 34b are disposed on the upper surfaces of the guide surfaces 30b and 30c, respectively, and a pair of detents 36a and 36b are disposed on the upper surfaces of the guide surfaces 32b and 32c, respectively. A pair of spaced, tapered bosses 38a and 38b are provided on the recessed portion of the bottom plate 14 and are sized to extend in the slots 26a and 26b, respectively.

The steps of mounting of the support member 18 to the bottom plate 14 are better described with reference to FIGS. 2–4. More particularly, the support member 18 is initially placed below the bottom plate 14 as shown in FIG. 2 and advanced towards the bottom plate 14 until the upper portion of the base 20 extends in the recess formed by the counterbore 14d. In this position, the heads 24a and 24b extend through the enlarged end portions 30a and 32a of the slots 30 and 32, respectively, as shown by the phantom lines in FIG. 4 in connection with the head 24b.

The base 20 is then rotated in a clockwise direction relative to the bottom plate 14. During this rotation, the lower surface of the head 24a moves over the guide surfaces 30b and 30c, and the lower surface of the head 24b moves over the guide surfaces 32b and 32c until the posts 22a and 22b reach the other ends of the slots 30 and 32, respectively, at which time the bosses 38a and 38b extend in the slots 26a and 26b, respectively.

In this mounted position, the head 24a extends in the space, or pocket, defined between the upper surface of the bottom plate 14 and the upper surfaces of the guide surfaces 30b and 30c; and the head 24b extends in the space, or pocket, defined between the upper surface of the bottom plate 14 and the upper surfaces of the guide surfaces 32b and 32c.

In the mounted position of the member 20, the guide surfaces 30b and 30c are sandwiched between the lower surface of the head 24a and the upper surface of the base 20, and the guide surfaces 32b and 32c are sandwiched between the lower surface of the head 24b and the upper surface of the base 20. Also, the engagement of the bosses 38a and 38b in the slots 26a and 26b, respectively, prevents any rotational movement of the support member 18 and this is assisted by the detents 34a, 34b, 36a and 36b. Moreover, the recess 14d provides lateral support for the support member 18 and helps to prevent the support member from slipping out of its mounted position when the enclosure 12 is slid on a surface.

It is apparent from the above that the support member 18 can be mounted to the bottom plate 14 relatively easily without the use of additional parts and adhesives, yet is locked in its mounted position. Also, as shown in the mounted position of FIG. 4, the uppermost surfaces of the heads 24a and 24b extend flush with the upper surface of the bottom plate 14 and therefore do not protrude into the interior of the enclosure 12.

Figure 1:
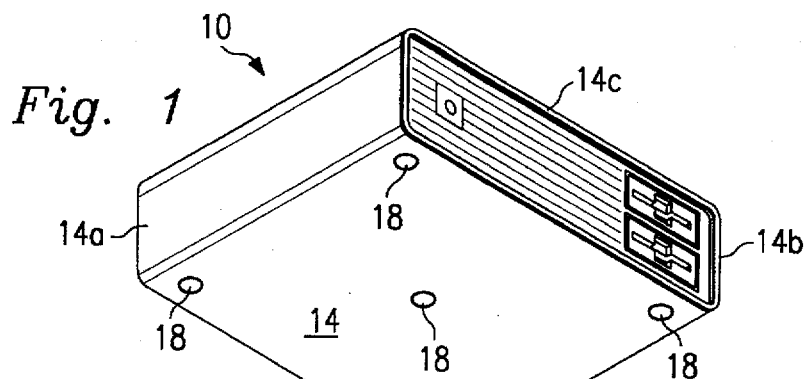
FIG. 1 is a perspective view of the exterior of an electronic equipment enclosure provided with support members according to the present invention.
Figure 4:
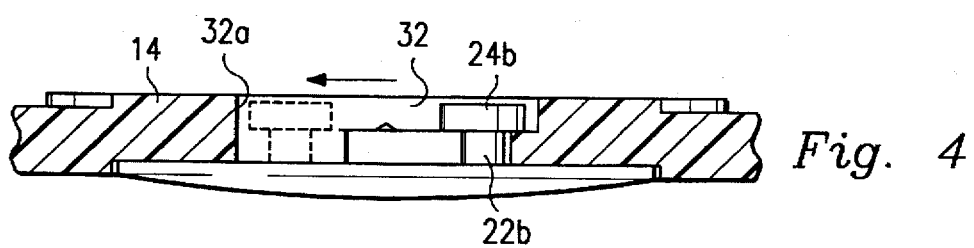

It is understood that the other support members 18 shown in FIG. 1 are identical to the support member shown in FIGS. 2–4 and described above, and that the bottom plate 14 is also configured as shown in FIGS. 2–4 for the additional support members. Also, the number of support members 18 mounted to the bottom plate 14 can vary within the scope of the present invention. Moreover, the present invention is not limited to computers, but is equally applicable for use with other devices within the scope of the present invention.

It is also understood that the embodiment of the present invention described above is intended to illustrate rather than limit the invention, and that the enclosure and the supports members of the present invention can take many other forms and embodiments within the scope of the invention.

What is claimed is:

1. A computer comprising an enclosure including a bottom plate defining two spaced keyhole slots each of which has an enlarged end portion and a reduced end portion; and a support member comprising a base, one end of which is adapted to engage the surface on which the computer is to be supported, two spaced posts projecting from another end of the base opposite the one end, and a head provided on a terminal end of each post, each enlarged end portion having a dimension greater than the corresponding dimension of each head, and each reduced end portion having a dimension less than the corresponding dimension of each head so that the heads can be inserted in the respective enlarged end portions of the keyhole slots, and the support member rotated, to move the heads and the posts of the support member to the reduced end portion of their respective keyhole slots to mount the support member to the enclosure, first detent means for engaging the heads of the posts and second detent means for engaging the support member.

2. The computer of claim 1 wherein the bottom plate includes a lower portion and an upper surface, a recess is formed in the lower portion of the bottom plate for receiving the support member, the first detent means being in the slots and the second detent means being in the recess.

3. The computer of claim 2 wherein a raised portion is formed on the upper surface of the bottom plate so that the heads extend into the raised portion and flush with the upper surface of the bottom plate.

4. The computer of claim 1 wherein the support member includes detent slots formed therein for receiving the second detent means.

5. The computer of claim 1 wherein the heads and the enlarged end portions have a circular cross-section and wherein the diameter of each head is less than the diameter of each enlarged end portion and greater than the width of each reduced endportion.

6. A method for supporting a computer having an enclosure including a bottom plate having a lower portion and an upper surface, comprising the steps of providing a support member having two spaced posts each of which has a head formed on a distal end thereof, forming two spaced slots through the bottom plate of the enclosure, forming an enlarged end portion at one end of each of the slots and a reduced end portion at an opposite end of each slot, each enlarged end portion having a dimension greater than the corresponding dimension of each head, and each slot having a dimension less than the corresponding dimension of each head, inserting the heads in the respective enlarged end portions of the slots, rotating the support member to move the heads and the posts of the support member to the reduced end portions of their respective slots to mount the support member to the enclosure, providing first detent means for engaging the heads of the posts and providing second detent means for engaging the support member.

7. The method of claim 6 further comprising the step of forming a recess in the lower portion of the bottom plate for receiving the support member.

8. The method of claim 6 further comprising the step of forming a raised portion on the upper surface of the bottom plate so that the heads extend into the raised portion and flush with the upper surface of the bottom plate.

9. In combination, a computer comprising an enclosure having a bottom plate including a lower portion and an upper surface defining two spaced arcuate keyhole slots each of which has an enlarged end portion and a reduced end portion; and a support member comprising a base, one end of which is adapted to engage the surface on which the computer is to be supported, two spaced posts projecting from another end of the base opposite the one end, and a head provided on a terminal end of each post, each enlarged end portion having a dimension greater than the corresponding dimension of each head, and each reduced end portion having a dimension less than the corresponding dimension of each head so that the heads can be inserted in the respective enlarged end portions of the keyhole slots, and the support member rotated, to move the heads and the posts of the support member to the reduced end portion of their respective keyhole slots to mount the support member to the enclosure, first detent means on the bottom plate for engaging the heads of the posts and second detent means on the bottom plate for engaging the support member.

10. The combination of claim 9 wherein a recess is formed in the lower portion of the bottom plate for receiving the support member.

11. The combination of claim 9 wherein a raised portion is formed on the upper surface of the bottom plate so that the heads extend into the raised portion and flush with the upper surface of the bottom plate.

12. The combination of claim 9 wherein the support member includes detent slots formed therein for receiving the second detent means.

13. The combination of claim 9 wherein the heads and the enlarged end portions have a circular cross-section and wherein the diameter of each head is less than the diameter of each enlarged end portion and greater than the width of each reduced end portion.

* * * * *

UNITED STATES PATENT AND TRADEMARK OFFICE
CERTIFICATE OF CORRECTION

PATENT NO. : 5,688,030
DATED : November 18, 1997
INVENTOR(S) : McAnally et al.

It is certified that error appears in the above-identified patent and that said Letters Patent is hereby corrected as shown below:

<u>Title page,</u>
Item [73], Assignee, please insert -- Dell USA, L.P., Austin, Texas --

Signed and Sealed this

Twentieth Day of May, 2003

JAMES E. ROGAN
*Director of the United States Patent and Trademark Office*